United States Patent [19]

Sasajima et al.

[11] Patent Number: 5,272,602
[45] Date of Patent: Dec. 21, 1993

[54] DEVICE FOR MOUNTING A SUPPLEMENTAL STOP LAMP OR THE LIKE TO A WINDOWPANE WITH EASE OF CONNECTION TO A POWER SUPPLY

[75] Inventors: Tetsuo Sasajima; Masaru Morikawa, both of Sagamihara; Hiroshige Shinkai, Shimizu; Kihachiro Uchida, Shimizu; Tsutomu Machida, Shimizu, all of Japan

[73] Assignees: Nippon Sheet Glass Co., Ltd., Osaka; Koito Manufacturing Co., Ltd., Tokyo, both of Japan

[21] Appl. No.: 874,127

[22] Filed: Apr. 27, 1992

[30] Foreign Application Priority Data

Apr. 26, 1991 [JP] Japan ................ 3-122975

[51] Int. Cl.5 ............................................. B60Q 1/26
[52] U.S. Cl. .................... 362/80.1; 362/800; 362/396
[58] Field of Search .................... 340/815.03, 479; 362/80.1, 61, 80, 83.3, 800, 396

[56] References Cited

U.S. PATENT DOCUMENTS

| 4,463,411 | 7/1984 | Proctor | 362/61 |
| 4,488,141 | 12/1984 | Ohienforst et al. | 340/97 |
| 4,591,954 | 5/1986 | Kawamura et al. | 362/61 |
| 4,854,636 | 8/1989 | Greenhaigh et al. | 296/201 |
| 5,132,882 | 7/1992 | Alder | 362/80.1 |

Primary Examiner—Stephen F. Husar
Attorney, Agent, or Firm—Sughrue, Mion, Zinn, Macpeak & Seas

[57] ABSTRACT

A pair of conductive patterns, which are to be electrically connected to the battery of a motor vehicle, are formed as by baking on the interior surface of the rear windowpane of the vehicle. A pair of nuts or brackets of electrically conductive material are soldered to the conductive patterns. The lamp body of a supplemental high mounted stop lamp are fastened to the nuts or brackets, with the light sources of the lamp electrically connected in circuit therewith.

9 Claims, 12 Drawing Sheets

DEVICE FOR MOUNTING A SUPPLEMENTAL STOP LAMP OR THE LIKE TO A WINDOWPANE WITH EASE OF CONNECTION TO A POWER SUPPLY

BACKGROUND OF THE INVENTION

This invention relates to electric lamps in general and, in particular, to a supplemental high mounted stop lamp for motor vehicles. More specifically, the invention deals with such a lamp featuring improved means for mounting the lamp to a windowpane, typically the rear windowpane of a motor vehicle, and, in so doing, electrically connecting the lamp to a power supply.

The high mounted stop lamp is finding ever increasing use on motor vehicles, passenger cars in particular, to supplement the stop lamp system and to provide a signal through intervening vehicles to operators of following vehicles. Some supplemental stop lamps are mounted high on the interior surface of the rear windowpane. Typically, such a lamp comprises a row of light emitting diodes mounted to a printed circuit board and electrically connected to the conductive pattern thereon. The light emitting diodes together with the printed circuit board is housed in a horizontally elongated, boxlike lamp body. This lamp body had an open side which is closed by a lens or lenses and which is contoured to fit the inside curvature of the rear windowpane.

Conventionally, this type of supplemental stop lamp was mounted by bonding the open side of the lamp body directly to the rear windowpane. For supplying power to the light emitting diodes, the printed circuit board was electrically coupled to cables which extend out of the lamp housing for connection to the battery of the vehicle by way of cable harnesses.

This conventional practice is objectionable for several reasons. First, the mounting of the supplemental stop lamp and its electrical connection to the power supply constituted two separate jobs. The mounting of the stop lamp will become much easier and less time consuming if it is electrically connected to the power supply at the same time it is mounted in position on the windowpane. Second, the weight of the cables added to that of the stop lamp, making it more susceptible to detachment from the windowpane due to the bumps and vibrations of the vehicle.

Third, the cables were subject to deterioration with the lapse of time. Such deteriorated cables were easy to break with vehicle bumps and vibrations, particularly at their connections to the stop lamp. The use of cables is objectionable for esthetic reasons, too, as some lengths of the cables were visible through the rear window of the vehicle.

SUMMARY OF THE INVENTION

The present invention solves the problem of how to mount a supplemental high mounted stop lamp or like electric lamp to a windowpane such as the rear windowpane of a motor vehicle without the noted inconveniences heretofore encountered in electrically connecting the lamp to its power supply.

Broadly, the invention may be summarized as an electric lamp assembly to be mounted to a windowpane, typically the rear windowpane of a motor vehicle, with ready electrical connection to power supply means. The lamp assembly comprises light source means within a lamp body, and connector means electrically connected to the light source means. The windowpane to which the lamp assembly is to be mounted has formed thereon a pair of electrically conductive power supply patterns, to which there are secured, as by soldering, a first pair of fastener means of electrically conductive material in electrically conducting relationship to the power supply patterns. The lamp body is fastened to the first pair of fastener means by a second pair of fastener means, by which the connector means is held in electrical contact with the first pair of fastener means.

Thus, according to the invention, the light source means is electrically connected to the power supply patterns, and thence to the vehicle battery or equivalent power supply, simply as the lamp body is fastened to the windowpane. The mounting of a supplemental high mounted stop lamp is therefore made materially simpler than heretofore.

As an additional advantage, the supplemental stop lamp constructed and mounted in accordance with the invention need not have any power cables coupled thereto. All the listed inconveniences hitherto encountered with such cables can be thoroughly overcome.

The above and other features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

Figure 1:
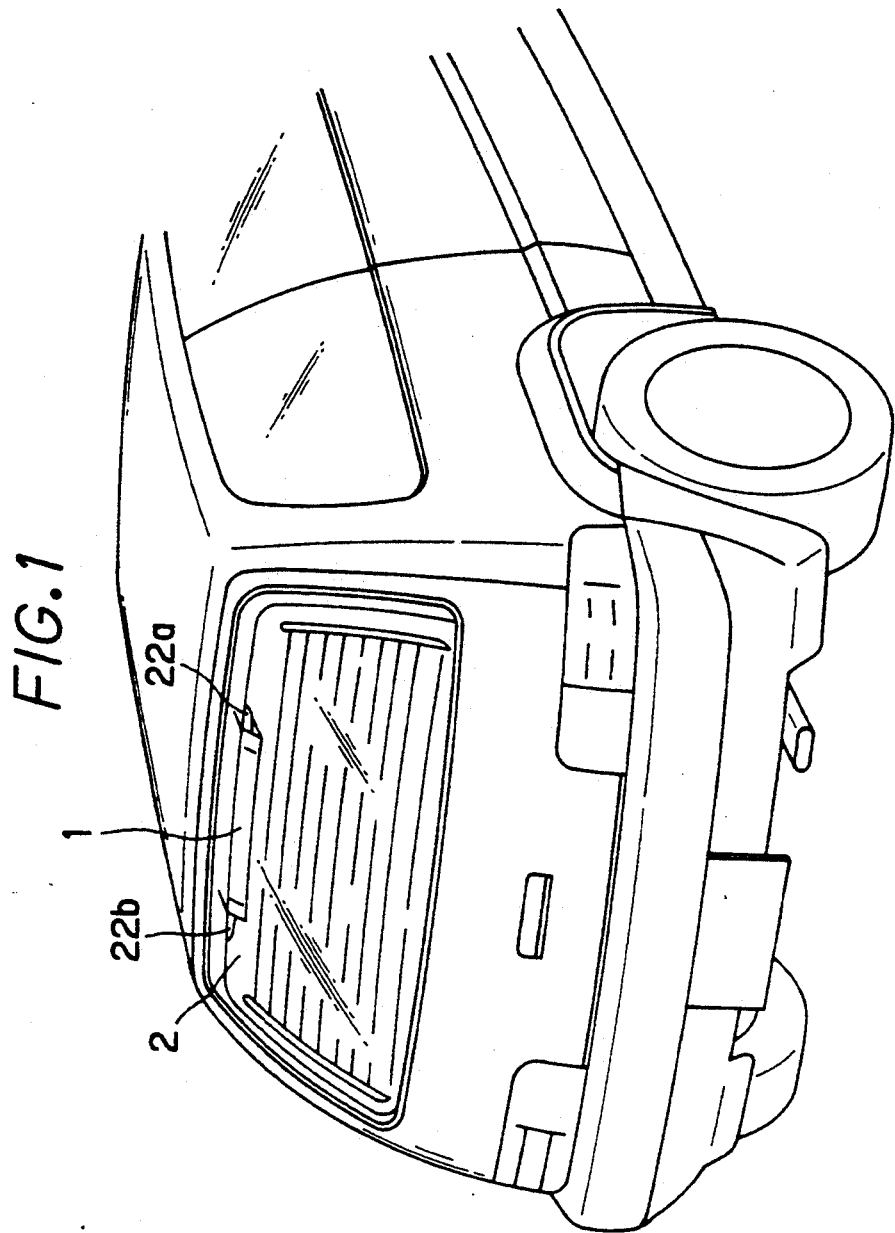
FIG. 1 is a partial perspective view of a motor vehicle with the supplemental stop lamp mounted high on its rear windowpane in accordance with the invention.

The present invention is shown in FIG. 1 as embodied in the supplemental stop lamp 1 mounted high on the interior surface of the rear windowpane 2 of a motor vehicle. The stop lamp 1 could, however, be of course mounted near the bottom edge of the windowpane 2.

Figure 2:
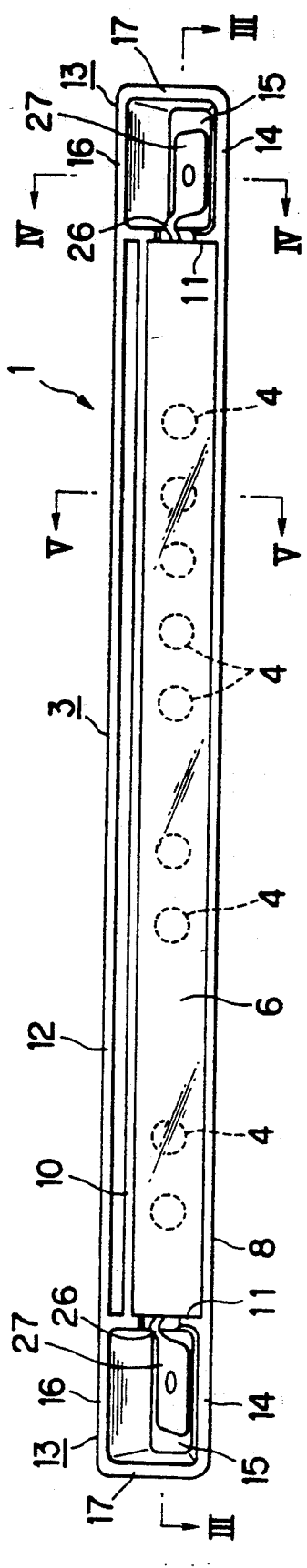
FIG. 2 is an enlarged front elevation of the supplemental high mounted stop lamp of FIG. 1.
Figure 3:
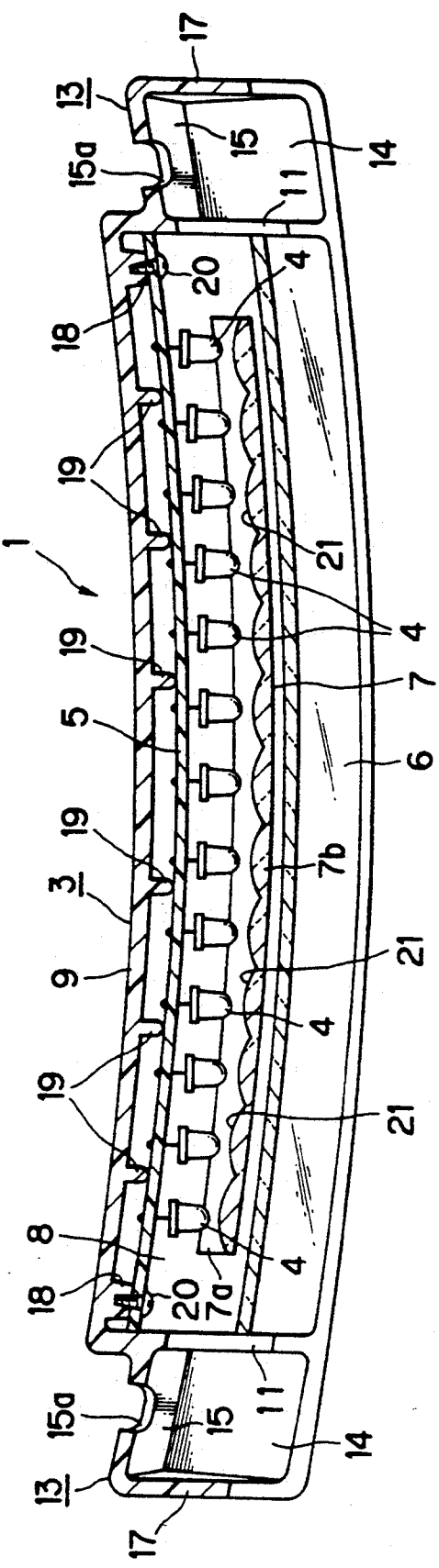
FIG. 3 is a horizontal section through the lamp, taken along the line III—III in FIG. 2.

As illustrated in front elevation in FIG. 2 and in horizontal section in FIG. 3, the supplemental high mounted stop lamp 1 comprises a horizontally elongated, forwardly open, relatively shallow boxlike lamp body 3. A plurality of light sources 4 such as, typically light emitting diodes, are mounted in alignment to a printed circuit board 5 and altogether housed in a lamp body 3. It is understood that the printed circuit board 5 has formed thereon a conductive pattern, not shown, constituting part of a power supply circuit for the light sources 4. A planar outer lens 6 covers the open front side of the lamp body 3, and a planoconvex inner lens system 7 is disposed between light sources 4 and outer lens 6.

Figure 5:
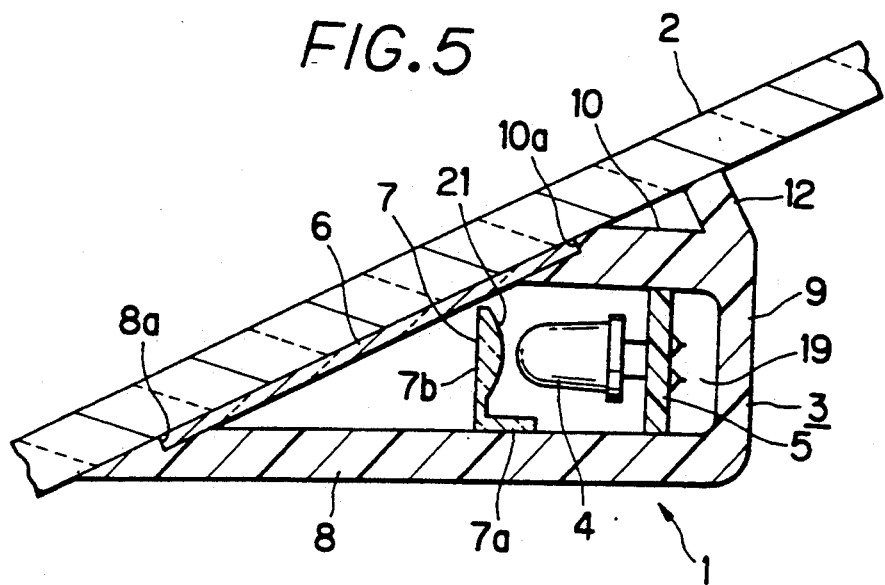
FIG. 5 is another enlarged vertical section through the lamp, taken along the line V—V in FIG. 2.

As will be seen also from FIGS. 2 and 3 taken together with FIG. 5, the lamp body 3 is a one piece molding of a rigid, opaque plastic. Thus the lamp body 3 integrally comprises: (a) a bottom wall 8 which is gently convexed forwardly as seen in a plan view as in FIG. 3; (b) a rear wall 9 erected upwardly from the rear edge of the bottom wall 8; (c) a top wall 10 extending forwardly from the top edge of the rear wall 9 to an extent approximately one third of the width of the bottom wall 8; and (d) a pair of side walls 11. FIGS. 2 and 5 also reveal a fin 12 extending upwardly and forwardly from the rear edge of the top wall 10.

Figure 4:
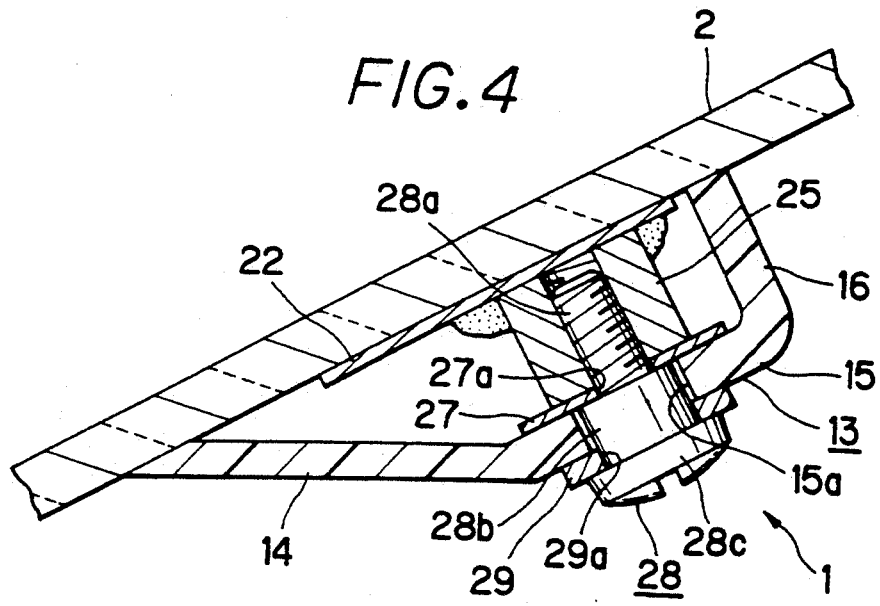
FIG. 4 is a still more enlarged vertical section through the lamp, taken along the line IV—IV in FIG. 2.

The reference numeral 13 in FIGS. 2-4 generally designates a pair of lamp body extensions formed at both longitudinal or horizontal ends of the lamp body 3 for use in mounting the stop lamp 1 to the vehicle windowpane 2. Formed in one piece with the lamp body 3, each extension 13 comprises: (a) a bottom wall 14 forming a coplanar extension of the lamp body bottom wall 8, with a front edge disposed flush with that of the lamp body bottom wall, and extending rearwardly to an extent approximately two thirds of the width of the lamp body bottom wall; (b) a rear wall 15 extending upwardly and rearwardly from the rear edge of the extension bottom wall 14 so as to be in parallel spaced relationship to the windowpane 2; (c) a top wall 16 extending upwardly and forwardly from the top edge of the extension rear wall 15; and (d) a side wall 17 closing the lateral end of the extension 13.

As shown in FIG. 3, the printed circuit board 5 is held against a series of ribs 19 and a pair of bosses 18 formed in a row on the lamp body bottom wall 9. As will be seen also from FIG. 8, the printed circuit board 5 is mounted in position by a pair of screws 20 extending through holes 5a in both ends of the printed circuit board and engaged in tapped holes 18a in the bosses 18.

FIG. 5 indicates that the outer lens 6 has its top and bottom edges engaged respectively in recesses 8a and 10a in the lamp body bottom wall 8 and lamp body top wall 10 and is secured to the lamp body 3 as by fusion or adhesion. Thus the outer lens 6 is convexed forwardly and upwardly in conformity with the contour of the open front side of the lamp body 3, in order to be held closely against the vehicle windowpane 2.

FIG. 5 further indicates that the inner lens system 7 is an integral combination of a mounting section 7a and a lens section 7b and is generally L shaped as seen in a cross section as in this figure. The lens section 7b is disposed forwardly of the light sources 4 on the printed circuit board 5 as the mounting section 7a is seated on the lamp body bottom wall 8 and secured thereto as by fusion or adhesion. The lens section 7b is formed to include a series of converging lens elements 21 which are individually opposed to the light sources 4 for producing parallel rays of light oriented forwardly of the stop lamp 1, or rearwardly of the motor vehicle.

Figure 6:
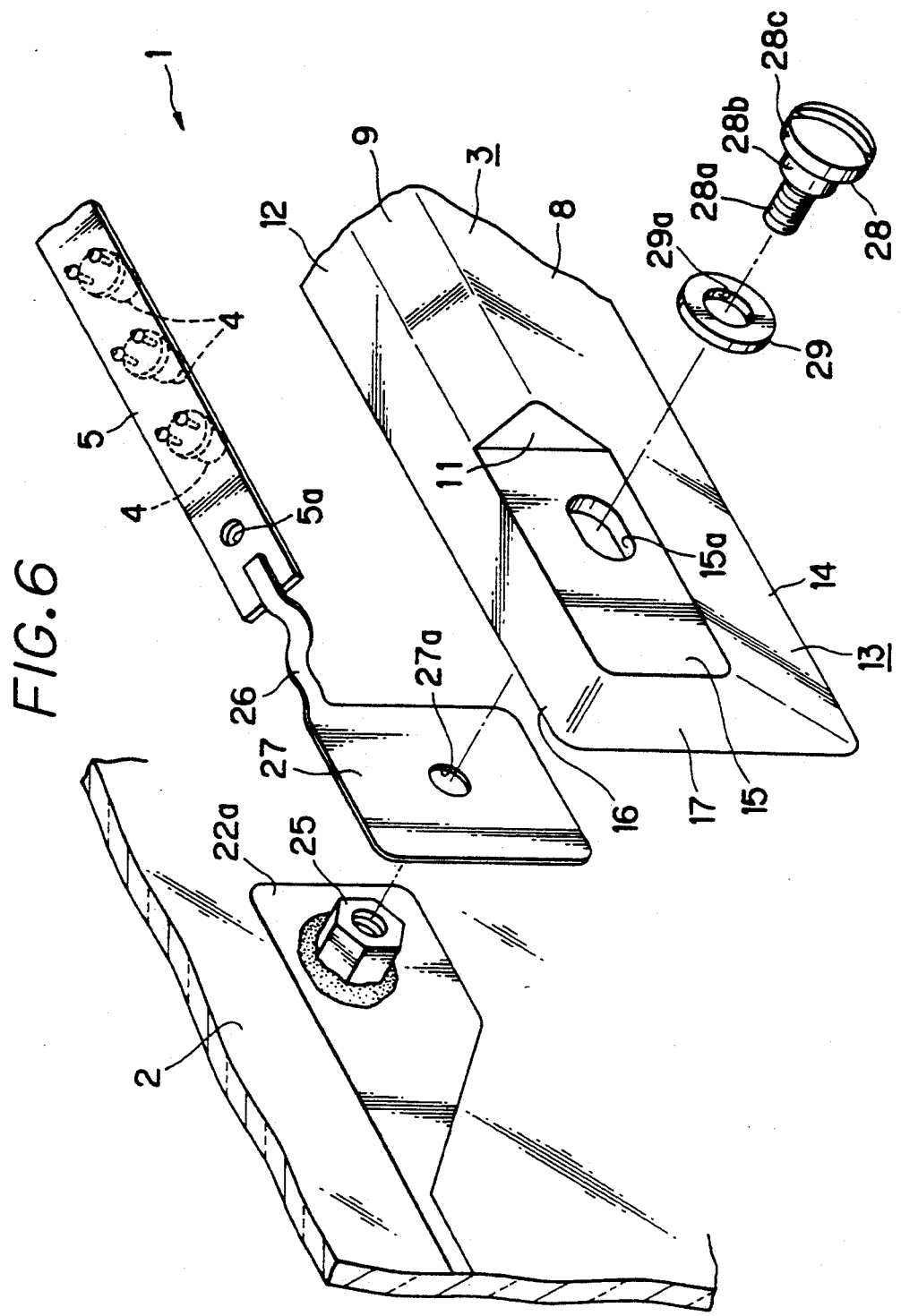
FIG. 6 is an exploded, fragmentary perspective view showing how the lamp is mounted to the windowpane of the vehicle at one end thereof.
Figure 8:
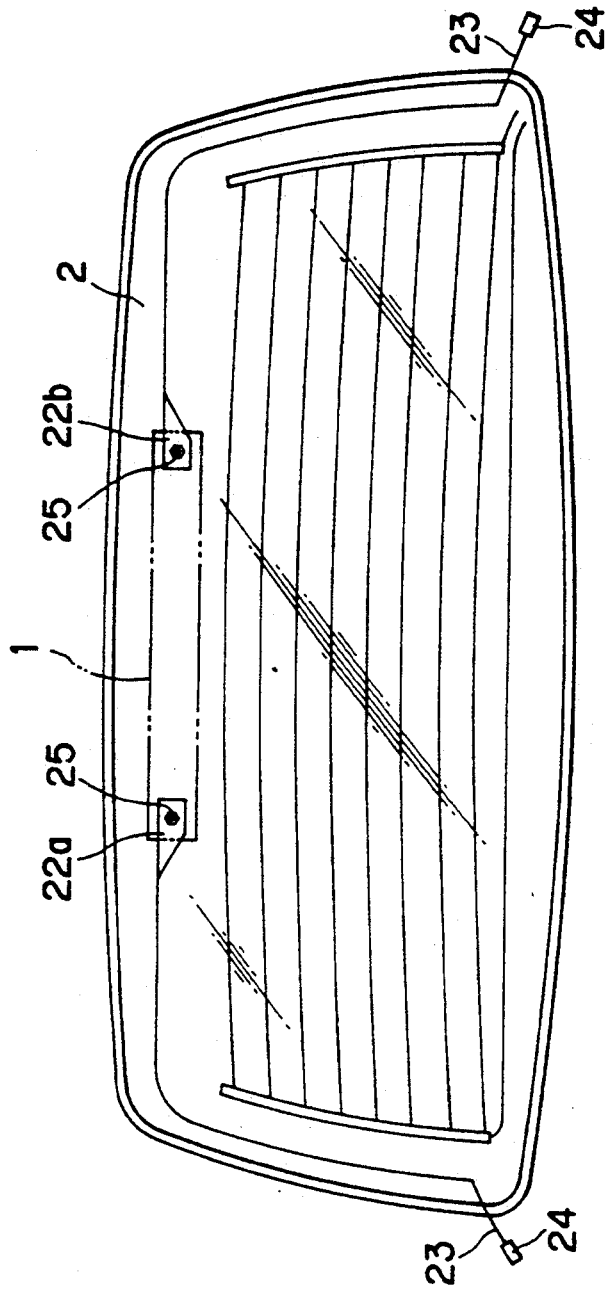
FIG. 8 is an enlarged elevation of the rear windowpane of the FIG. 1 vehicle, showing the supplemental stop lamp mounted thereto together with power supply means.
Figure 9:
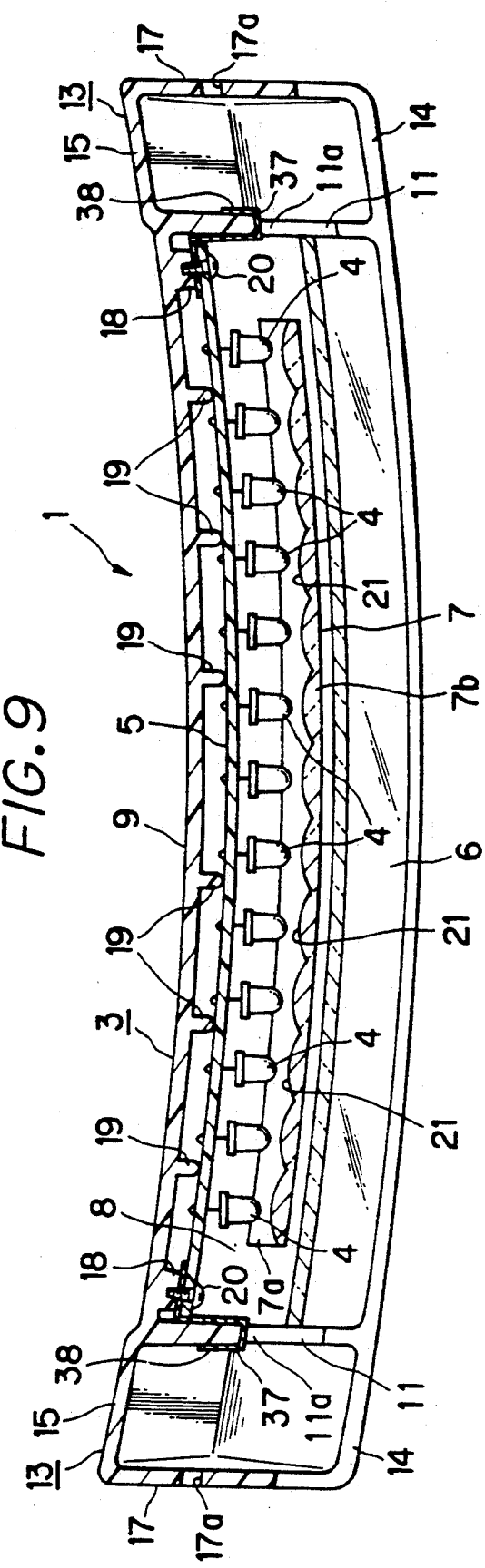
FIG. 9 is a sectional view similar to FIG. 3 but showing an alternate embodiment of the invention.

As depicted in FIG. 1, and in more detail in FIGS. 4, 6 and 8, a pair of electrically conductive patterns 22a and 22b are formed on the interior surface of the vehicle rear windowpane 2 as by baking. In FIG. 4 the single conductive pattern shown in FIG. 4 is designated 22 as it can be either of the two conductive patterns 22a and 22b. The conductive patterns 22a and 22b are soldered respectively to a pair of cables 23, FIG. 8, which extend along the top and side edges of the windowpane 2 to terminate in connectors 24. Despite the showing of FIG. 8, however, the cables 23 could be inconspicuously concealed as behind the framework of the windowpane 2. The cable connectors 24 are intended to be coupled to body harness connectors not shown, of the vehicle thereby to be connected to the positive and negative sides, respectively, of a battery or like power supply, also not shown, mounted on the vehicle.

As shown also in FIGS. 4, 6 and 8, a pair of nuts 25 of electrically conductive material are soldered or otherwise firmly attached to the respective conductive patterns 22a and 22b in electrically conducting relationship thereto. These nuts 25 serve therefore as the supply terminals of the stop lamp 1.

For electrically connecting the conductive patterns 22a and 22b to the printed circuit board 5, there are provided a pair of sheet metal connectors 27 of square shape, FIGS. 2, 4, 6 and 7, which preferably are covered in part with films of electrically insulating material. Each sheet metal connector 27 is formed to include a flexible arm 26 which is electrically connected to the unshown conductive pattern on the printed circuit board 5.

Figure 7:
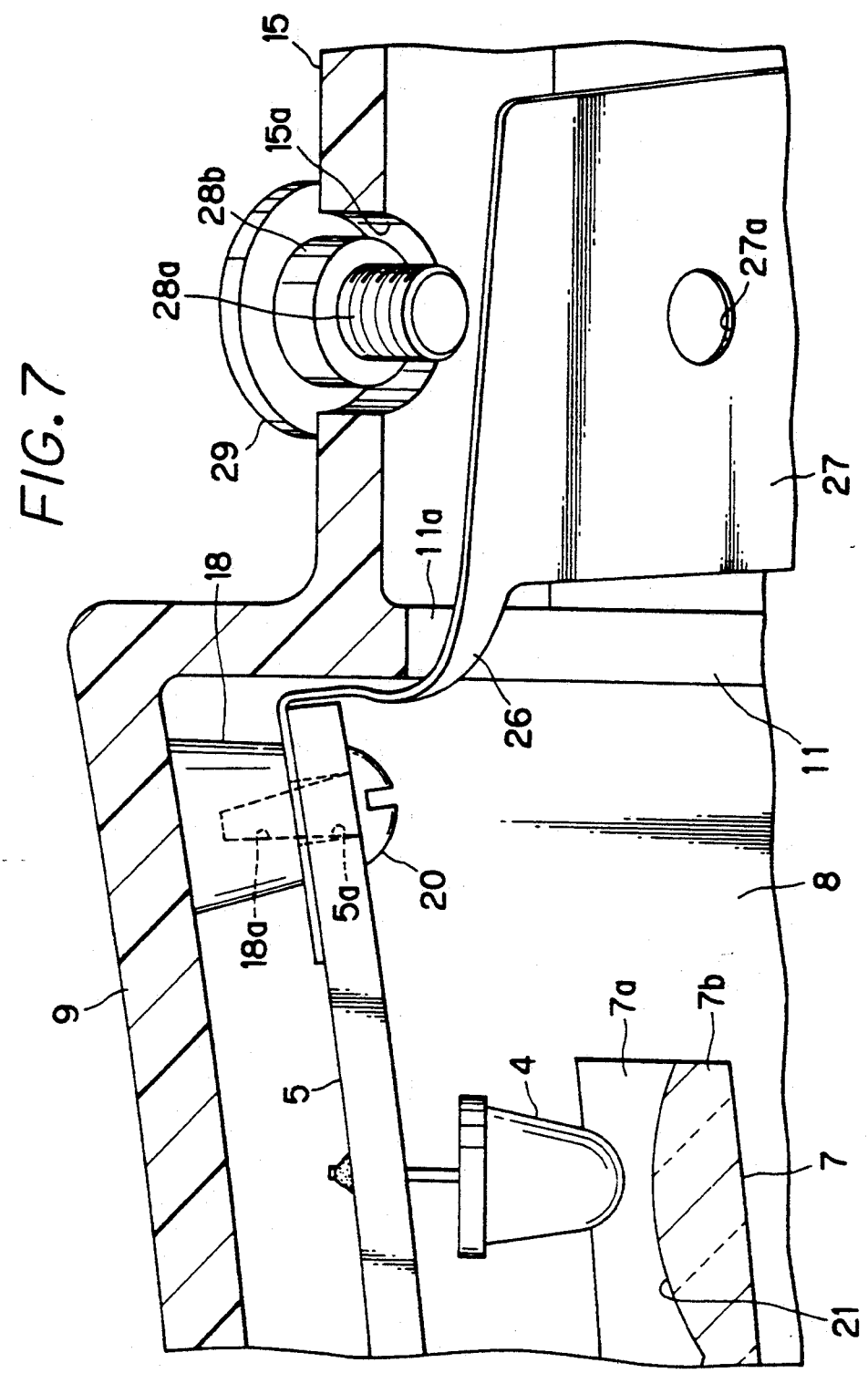
FIG. 7 is a horizontal section somewhat similar to FIG. 3 but showing one end portion of the lamp on an even more enlarged scale.

At 28 in FIGS. 4, 6, and 7 is seen a mounting bolt inserted in and through a clearance hole or slot 15a in each lamp body extension rear wall 15 and a hole 27a in each sheet metal connector 27 and engaged in each nut 25. It will be seen that the stop lamp 1 is fastened to the vehicle rear windowpane 2 by a pair of such mounting bolts 28 with the associated nuts 25.

Each mounting bolt 28 comprises a threaded shank portion 28a, a blank shank portion 28b and a head 28c. The threaded shank portion 28a has a major diameter greater than the diameter of the hole 27a in each sheet metal connector 27 and a minor diameter less than the diameter of the hole 27a. The blank shank portion 28b has a diameter somewhat more than the major diameter of the threaded shank portion 28a, and a length somewhat more than the thickness of each lamp body extension rear wall 15. The head 28c in approximately twice in diameter than the blank shank portion 28b.

Preferably, and as shown, each mounting bolt 28 may be provided with a washer 29, which is caught between each lamp body extension rear wall 15 and the head 28c of the mounting bolt. Fabricated from Teflon (trademark) or like wear resistant material with a low coefficient of friction, the washer 29 has a hole 29a with a diameter somewhat more than that of the blank shank portion 28b of each mounting bolt 28.

For mounting the stop lamp 1, the pair of mounting bolts 28 with the washers 29 on their blank shank portions 28b may be inserted in and through the clearance slots 15a in the lamp body extension rear walls 15 and then into the holes 27a in the sheet metal connectors 27. The mounting bolts 28 may be turned into the holes 27a since the diameter of these holes is more than the minor diameter, and less than the major diameter, of the threaded shank portions 28a of the mounting bolts 28. Incidentally, the arms 26 of the sheet metal connectors 27 should be sufficiently long to develop a slack, as depicted in FIG. 6, when the mounting bolts 28 are engaged as above in the holes 27a.

Then, with the stop lamp 1 positioned on the rear windowpane 2, the threaded shank portions 28a of the mounting bolts 28 may be turned into the nuts 25 which have been soldered to the conductive patterns 22a and 22b on the windowpane. The mounting bolts 28 should be turned fully until their blank shank portions 28b butt endwise against the nuts 25 via the sheet metal connectors 27, as best pictured in FIG. 4.

The mounting of the stop lamp 1 has now been completed, and so has been the electrical connection of the stop lamp to the power supply. The pair of nuts or supply terminals 25 have been electrically connected via the sheet metal connectors 27 to the conductive pattern on the printed circuit board 5 and thence to the light sources 4 thereon.

Also, in this embodiment of the invention, the lamp body 3 is longitudinally movable, within the limits determined by the length of the clearance slots 15a in the lamp body extension rear walls 15, relative to the windowpane 2. There is therefore practically no possibility of the detachment of the stop lamp 1 from the windowpane 2 due to the difference between the rates of thermal expansion of the windowpane 2 and lamp body 3.

ALTERNATE FORM

FIGS. 9-13 illustrate an alternate form of supplemental high mounted stop lamp according to the invention. A comparison of FIGS. 3 and 9 in particular will reveal that the alternate stop lamp is generally analogous with the preceding embodiment except for the mounting means and the means for electrically connecting the light sources to a power supply. The alternate stop lamp features a pair of brackets 30 of electrically conductive material soldered respectively to the pair of conductive patterns 22a and 22b on the interior surface of the windowpane 2. It is therefore these brackets 30, rather than the nuts 25 of the preceding embodiment, that serve as supply terminals for the stop lamp.

Figure 13:
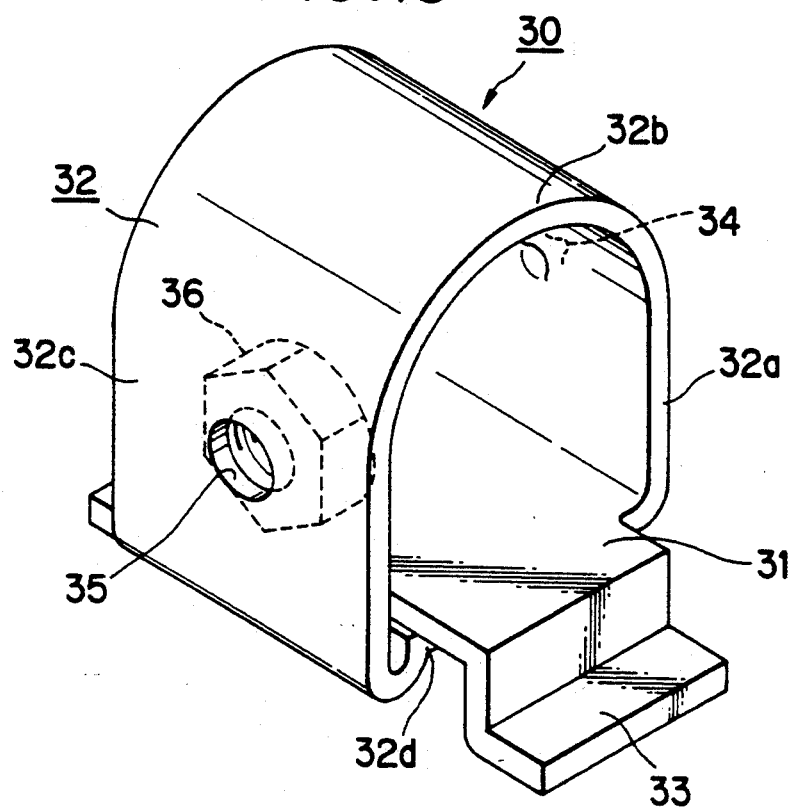
FIG. 13 is a still more enlarged perspective view of one of the pair of brackets used in the FIG. 9 embodiment.

As best pictured in FIG. 13, each bracket 30 is a punching of resilient sheet metal which has been bent into the illustrated shape comprising a flat base 31, a dome 32 of U shaped cross section, and a pair of L shaped mounting flanges 33. The base 31 is rectangular shape, having a length approximately twice its width. The dome 32 comprises a first side portion 32a bent right angularly from one longitudinal side edge of the base 31, a bight portion 32b, and a second side portion 32c joined at one end to the first side portion 32a via the bight portion 32b in parallel spaced relationship, and a flap portion 32d extending from the other end of the second side portion 32c and resiliently held against that side of the base 31 which is away from the dome 32. The pair of mounting flanges 33 extends in opposite directions from both longitudinal ends of the base 31.

Figure 10:
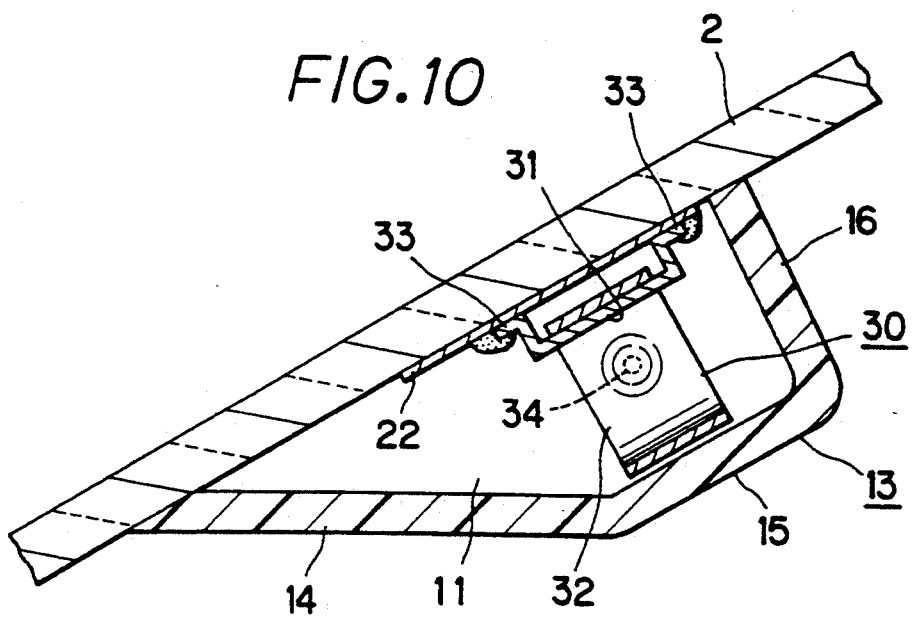
FIG. 10 is a section similar to FIG. 4 but showing the alternate embodiment of the invention.
Figure 11:
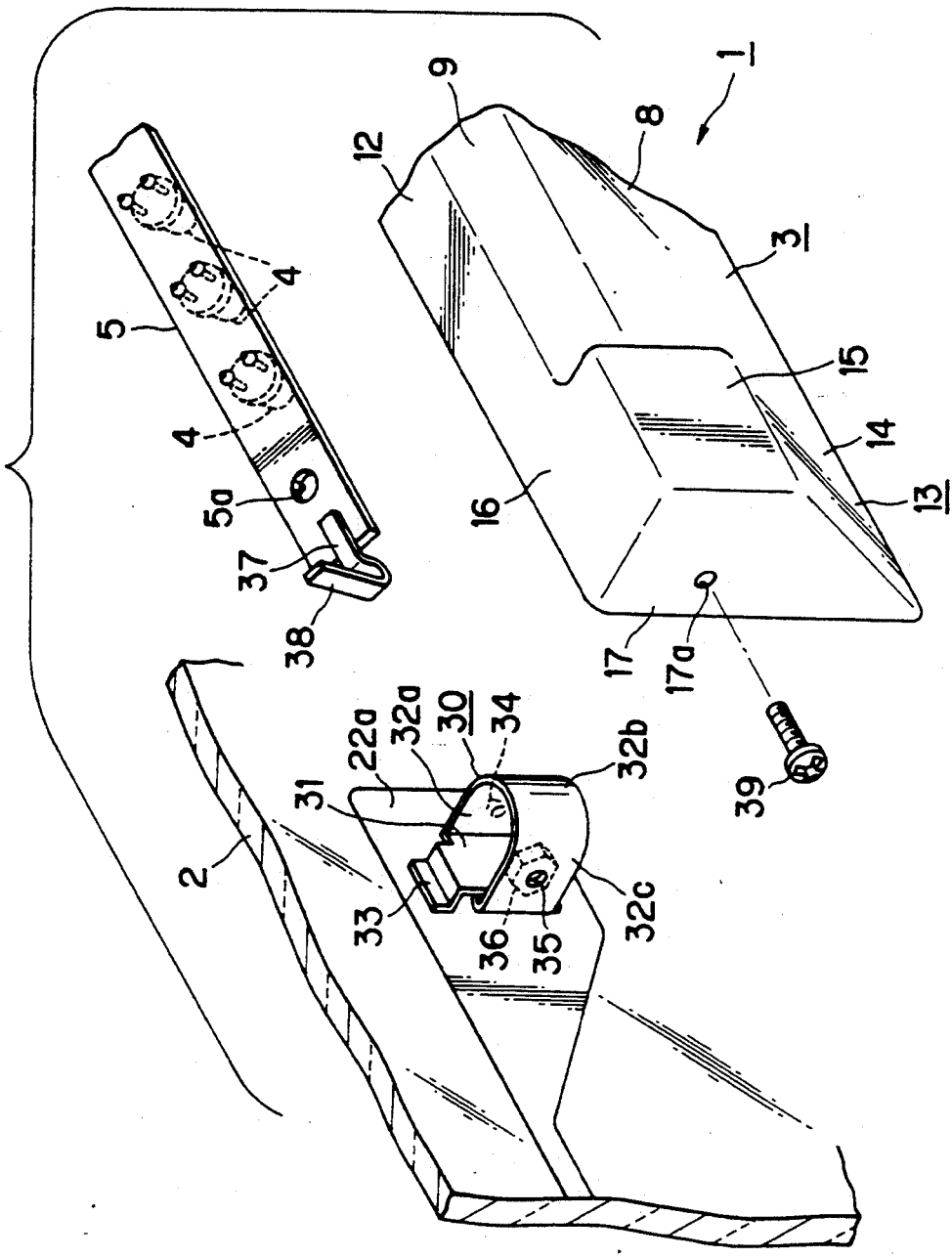
FIG. 11 is an exploded, fragmentary perspective view showing how the alternate supplemental stop lamp is mounted to the windowpane at one end thereof.
Figure 12:
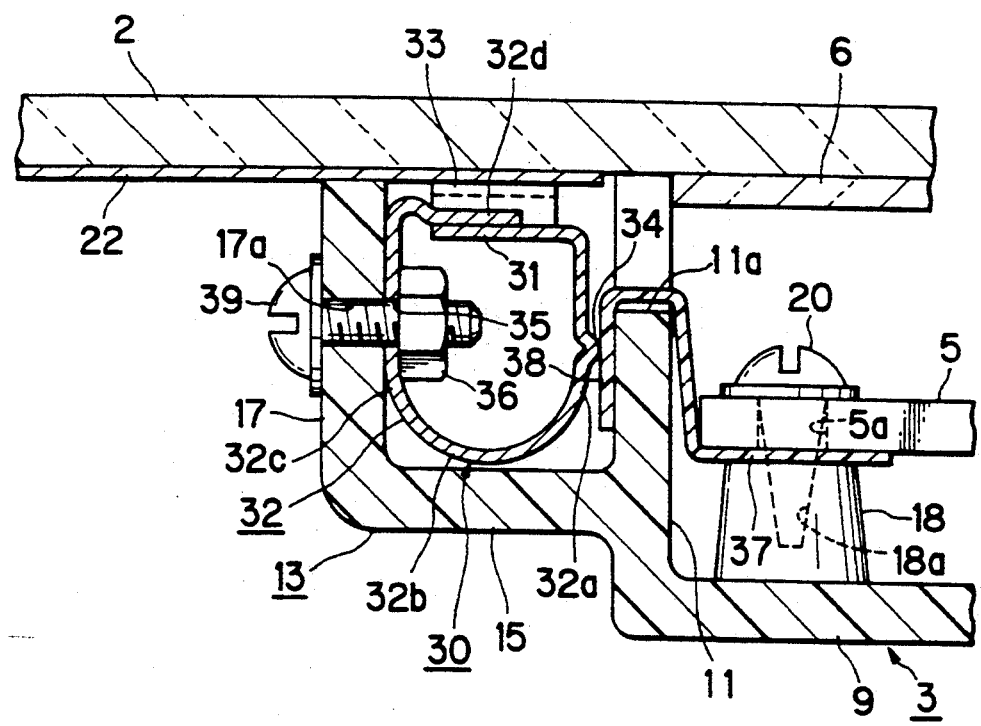
FIG. 12 is an enlarged, fragmentary section through the parts depicted in FIG. 11.

As will be understood from FIGS. 10-12, each bracket 30 is affixed to the windowpane 2 by having its pair of mounting flanges 33 soldered to one of the conductive patterns 22. So affixed to the windowpane 2, the pair of brackets 30 have the first side portions 32a of their domes 32 opposed to each other. Bosses 34 are formed on the opposed surfaces of these first side portions 32a.

At 37 in FIGS. 11 and 12 is seen one of a pair of connectors each in the form of a slender strip of sheet metal, preferably covered in part with a layer of electrically insulating material. Each connector 37 has one bared end electrically connected to the conductive pattern on the printed circuit board 5, extends therefrom through an opening 11a in one side wall 11 of the lamp body 3, and has another bared end 38 disposed within one lamp body extension 13.

The pair of brackets 30 may be soldered to the respective conductive patterns 22 on the windowpane 2 before mounting the stop lamp thereon. Then the stop lamp may be held against the windowpane 2, receiving the brackets 30 within the respective lamp body extensions 13. Thereupon the bared ends 38 of the connectors 37 will be held against the bosses 34 on the domes 32 of the brackets 30, with the consequent establishment of electrical connection between the brackets and the connectors.

The brackets 30 are made from resident sheet metal as aforesaid, and their domes 32 are so shaped and sized as to fit snugly in the respective lamp body extensions 13. Consequently, the stop lamp will not fall off the windowpane 2 if it is released after engaging the brackets 30 in the lamp body extensions 13.

Then the lamp body 3 may be fastened to the brackets 30 by inserting a pair of mounting bolts 39 in and through holes 17a in the lamp body extension side walls 17 and holes 35 in the bracket domes 32 and tightening the bolts with nuts 36. As desired, the holes 17a may be elongated in a direction normal to the plane of the windowpane 2 for the ease of alignment with the holes 35. The outer lens 6 of the stop lamp will be held against the interior surface of the windowpane 2 as the stop lamp is mounted as above.

Thus, in this alternate embodiment, too, the mounting of the stop lamp to the windowpane is tantamount to the completion of electrical connection of its light sources 4 to the power supply. Power will be fed through the body harnesses, connectors 24, cables 23, conductive patterns 22, brackets 30, connectors 37 and printed circuit board 5.

It will also be appreciated that the lamp body 3 is not bonded to the windowpane 2. Consequently, the lamp body 3 is longitudinally displaceable relative to the windowpane 2 within the limits determined by the degree of deflection of the domes 32 of the brackets 30. There is therefore practically no possibility of the detachment of the stop lamp 1 from the windowpane 2 due to the difference between the rates of thermal expansion of the windowpane 2 and lamp body 3.

Despite the foregoing detailed disclosure, it is not desired that the present invention be limited by the exact details of the illustrated embodiments. For example, instead of mounting the light emitting diodes on the printed circuit board, they could be mounted to suitable retainers, with a flexible printed circuit board disposed behind such retainers for feeding the light sources. Additional modifications, alterations or adaptations of this invention may be resorted to without departure from the scope of the following claims.

What is claimed is:

1. An electric lamp assembly to be mounted to a windowpane such as a rear windowpane of a motor vehicle with ready electrical connection to power supply means, the lamp assembly comprising:
   (a) a lamp body;
   (b) light source means within the lamp body;
   (c) connector means electrically connected to the light source means;
   (d) a pair of electrically conductive power supply patterns to be formed on a windowpane;
   (e) a first pair of fastener means of electrically conductive material to be secured respectively to the pair of power supply patterns on the windowpane in electrically conducting relationship to the power supply patterns; and
   (f) a second pair of fastener means for fastening the lamp body to the first pair of fastener means, respectively, and for holding the connector means in electrical contact with the first pair of fastener means;
   (g) whereby the light source means is electrically connected to the power supply patterns on the windowpane at the same time the lamp body is mounted to the windowpane.

2. The lamp assembly of claim 1 wherein the first pair of fastener means comprise a pair of nuts to be secured one to each power supply pattern on the windowpane, and wherein the second pair of fastener means comprise a pair of bolts for fastening the lamp body to the pair of nuts.

3. The lamp assembly of claim 2 wherein the connector means comprises a pair of connectors each having one end electrically connected to the light source means and another end engaged between one nut and one bolt.

4. The lamp assembly of claim 1 wherein the first pair of fastener means comprises a pair of brackets to be secured one to each power supply pattern on the windowpane, and wherein the second pair of fastener means comprises a pair of fasteners for fastening the lamp body to the pair of brackets.

5. The lamp assembly of claim 4 wherein the connector means comprises a pair of connectors each having one end electrically connected to the light source means and another end held in electrical contact with one bracket.

6. A supplemental stop lamp to be mounted to a rear windowpane of a motor vehicle with ready electrical connection to power supply means, the lamp assembly comprising:
   (a) an elongate lamp body having a pair of opposite ends;
   (b) light source means within the lamp body;
   (c) connector means connected electrically to the light source means;
   (d) a pair of electrically conductive power supply patterns to be formed on a windowpane;
   (e) a pair of nuts of electrically conductive material to be secured respectively to the pair of power supply patterns on the windowpane in electrically conducting relationship to the power supply patterns; and
   (f) a pair of bolts for fastening the opposite ends of the lamp body to the nuts and for holding the connector means in electrical contact with the nuts;
   (g) whereby the light source means is electrically connected to the power supply patterns on the windowpane at the same time the lamp body is mounted to the windowpane.

7. The supplemental stop lamp of claim 6 wherein each bolt extends through a clearance opening in one end of the lamp body in order to permit thermal expansion or contraction of the lamp body relative to the windowpane.

8. A supplemental stop lamp to be mounted to a rear windowpane of a motor vehicle with ready electrical connection to power supply means, the lamp assembly comprising:
   (a) an elongate lamp body having a pair of opposite ends;
   (b) light source means within the lamp body;
   (c) connector means connected electrically to the light source means;
   (d) a pair of conductive power supply patterns to be formed on a windowpane;
   (e) a pair of brackets of electrically conductive material to be secured respectively to the pair of power supply patterns on the windowpane in electrically conducting relationship to the power supply patterns; and
   (f) a pair of fasteners for fastening the opposite ends of the lamp body to the brackets, the connector means being held in electrical contact with the brackets when the lamp body is fastened to the brackets;
   (g) whereby the light source means is electrically connected to the power supply patterns on the windowpane at the same time the lamp body is mounted to the windowpane.

9. The supplemental stop lamp of claim 8 wherein each bracket is made of resilient material in order to permit thermal expansion or contraction of the lamp body relative to the windowpane.

* * * * *